United States Patent [19]

Emori et al.

[11] Patent Number: 5,168,949
[45] Date of Patent: Dec. 8, 1992

[54] STEERING FORCE CONTROL SYSTEM FOR POWER STEERING

[75] Inventors: Yasuyoshi Emori; Yukimitsu Minamibata, both of Saitama, Japan

[73] Assignee: Jidosha Kiki Co., Ltd., Tokyo, Japan

[21] Appl. No.: 686,661

[22] Filed: Apr. 17, 1991

[30] Foreign Application Priority Data

Apr. 19, 1990 [JP] Japan .................................. 2-104139

[51] Int. Cl.$^5$ .............................................. B62D 5/06
[52] U.S. Cl. ...................................... 180/143; 180/132
[58] Field of Search ...................... 180/132, 141, 143; 91/375 R, 375 A, 370, 371, 434; 60/375

[56] References Cited

U.S. PATENT DOCUMENTS

| | | | |
|---|---|---|---|
| 4,034,825 | 7/1977 | Adams | 180/143 |
| 4,606,424 | 8/1986 | Hasegawa | 180/143 |
| 4,619,339 | 10/1986 | Futaba et al. | 180/143 |
| 4,632,204 | 12/1986 | Honaga et al. | 180/143 |
| 4,691,797 | 9/1987 | Miller | 180/141 |
| 4,858,713 | 8/1989 | Kawakami et al. | 180/143 |

FOREIGN PATENT DOCUMENTS

| | | | |
|---|---|---|---|
| 3515124 | 10/1986 | Fed. Rep. of Germany | 180/132 |
| 33167 | 2/1985 | Japan | 180/143 |
| 12469 | 1/1986 | Japan | 180/143 |
| 2174653 | 11/1986 | United Kingdom | 180/143 |
| 02053 | 4/1986 | World Int. Prop. O. | 180/141 |
| 7323 | 12/1986 | World Int. Prop. O. | 180/143 |

*Primary Examiner*—Robert P. Olszewski
*Assistant Examiner*—Steven M. Reiss
*Attorney, Agent, or Firm*—Flynn, Thiel, Boutell & Tanis

[57] ABSTRACT

A subpump has its discharge flow rate increased in response to an increase in a vehicle speed. A variable throttle is disposed in a discharge passage from the subpump, and an oil pressure taken from the upstream side of the variable throttle is introduced into a hydraulic reaction chamber to produce a steering action. A main pump has its flow rate increased or decreased in accordance with a number of revolutions thereof, and feeds a pressure oil to a power steering control valve through a passage in which a fixed restriction is disposed. An oil pressure which prevails upstream of the fixed restriction acts upon the variable throttle to change its area of opening, thereby controlling the steering force.

3 Claims, 3 Drawing Sheets

V: vehicle speed
$V_0 < V_1 < V_2 < V_3$

V: vehicle speed
$V_0 < \cdots < V_4$ ered by adding vehicle speed element to a hydraulic reaction chamber in a hydraulic reaction mechanism to produce a steering reaction, which may be sensed by a driver of the vehicle as a steering resistance.

STEERING FORCE CONTROL SYSTEM FOR POWER STEERING

BACKGROUND OF THE INVENTION

The invention relates to a power steering, in particular, to a steering force control system which controls an oil pressure acting upon a hydraulic reaction mechanism.

In a conventional power steering scheme which is responsive to a vehicle speed, a control valve is operated in accordance with an input applied to a steering wheel to introduce a pressure oil into one of chambers of a power cylinder to impart a steering assisting force to steerable road wheels while applying an oil pressure controlled by adding vehicle speed element to a hydraulic reaction chamber in a hydraulic reaction mechanism to produce a steering reaction, which may be sensed by a driver of the vehicle as a steering resistance.

FIG. 6 schematically shows an example of a conventional hydraulic reaction mechanism. A vehicle speed responsive pump 100 increases its discharge to a discharge passage 102 in response to an increase in the vehicle speed, and a variable throttle 104 is disposed in the passage. An oil pressure which is taken from the upstream side of the throttle 104 is introduced into a hydraulic reaction chamber 106 where a steering reaction is produced.

In a vehicle speed responsive power steering which is provided with a conventional hydraulic reaction mechanism as mentioned above, the pitch of controlling a reaction pressure steering force in a constant operative condition of a main control valve is determined by the following equation:

$$\Delta P = \left(\frac{Q}{KA}\right)^2$$

K: Constant Ratio Number
ΔP: Variable Pressure Rate of Hydraulic Reaction Chamber where Q represents a discharge flow rate and A a cross sectional area of a throttle. Accordingly, there occurs a greater change toward the high speed end (see FIG. 7) which is undesirable in providing a proper steering sensation.

SUMMARY OF THE INVENTION

Accordingly, it is an object of the invention to provide a steering force control system for power steering which utilizes a simple construction to allow an arbitrary choice of a pitch for controlling a steering force.

Such object is accomplished in accordance with the invention in which a variable throttle which controls an oil pressure to be introduced into a hydraulic reaction chamber is acted upon by an oil pressure which prevails upstream of a fixed restriction disposed in a supply passage from a main pump to the power steering apparatus.

DESCRIPTION OF EMBODIMENTS

Figure 1:
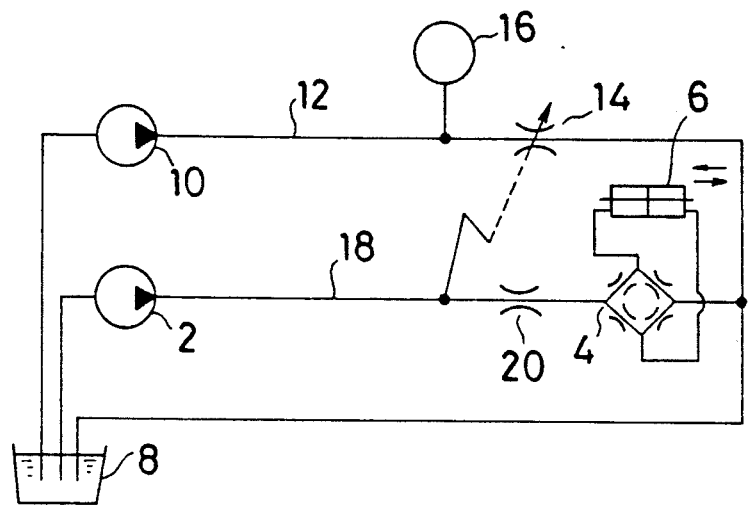
FIG. 1 is a schematic diagram of a steering force control system for power steering according to one embodiment of the invention.

The invention will now be described with reference to several embodiments thereof with reference to the drawings.

A main power steering pump 2 has a flow characteristic such that a discharge flow rate varies with a number of revolutions thereof, and a pressure oil which is discharged by the pump is fed through a control valve 4 to one of chambers of a power cylinder 6 while the oil is displaced from the other chamber to be returned to a tank 8.

A subpump 10 which is responsive to a vehicle speed such that its discharge flow rate increases in proportion to an increase in the vehicle speed has a discharge line 12 in which a variable throttle 14 is disposed. An oil pressure is taken from the upstream side of the variable throttle 14 to be introduced into a hydraulic reaction chamber 16 where a steering reaction is produced. In the present embodiment, a fixed restriction 20 is disposed in a supply line 18 from the main pump 2 to the control valve 4, and the area of opening of the variable throttle 14 is changed in accordance with an oil pressure which prevails upstream of the fixed restriction 20.

Figure 2:
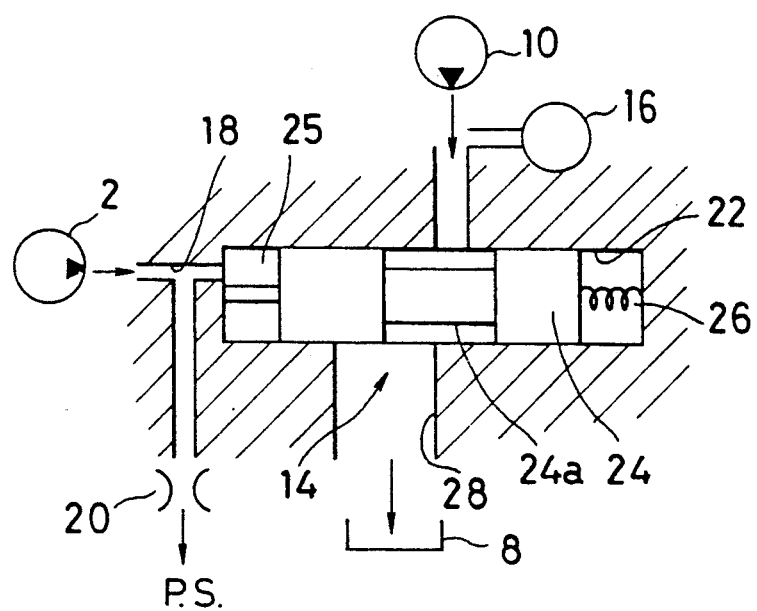
FIG. 2 is a cross section of one form of variable throttle.

FIG. 2 shows one form of a variable throttle 14. Specifically, a spool 24 is slidably disposed in a valve opening 22 and is urged by a spring 26. The spool 24 has an annular groove 24a formed in its outer peripheral surface, and the subpump 10 and the tank 8 communicate with each other through the annular goove 24a. The fixed restriction 20 is formed in a supply line 18 from the main pump 2 to the power steering apparatus, and an oil pressure which prevails upstream of the restriction 20 is introduced into a chamber 25 which is disposed to the left of the spool 24. A passage 28 which extends from the annular groove 24a to the tank 8 has its area of opening decreased by the variable throttle 14 in accordance with a movement of the spool 22.

In a steering force control system for power steering as described above, a pressure which prevails upstream of the fixed restriction 20 disposed in the supply passage 18 from the main pump 2 acts upon the left end face of the spool 24. A discharge flow rate from the main pump 2 increases or decreases in accordance with the number of revolutions thereof which is substantially proportional to a vehicle speed, and the pressure prevailing upstream of the fixed restriction 20 varies with such a change in the flow rate. In accordance with the pressure acting upon the left end face of the spool 24, the spool 24 is driven to the right from the position shown in FIG. 2 against the resilience of the spring 26, thus changing the area of opening of the variable throttle 14. As a consequence, the oil pressure which is introduced into the hydraulic reaction chamber 16 can be changed, thus allowing a steering force to be controlled.

Figure 3:
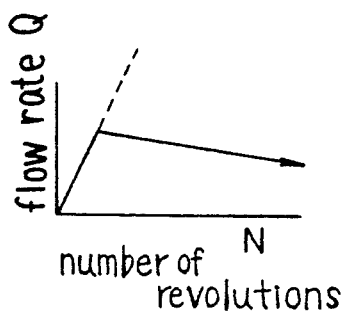
FIG. 3 graphically illustrates an example of the characteristic of a power steering main pump.
Figure 4:
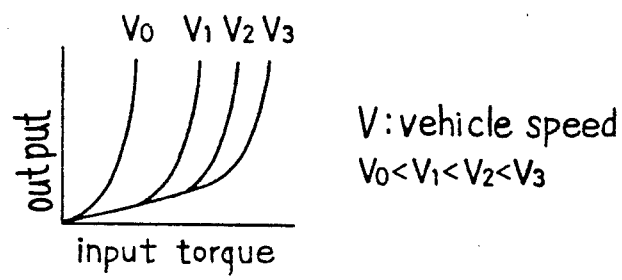
FIG. 4 graphically shows a relationship between an output and an input torque of the embodiment.

If a main pump is selected for the pump 2 which exhibits a characteristic as illustrated in FIG. 3, the pitch with which the steering force changes can be reduced toward the higher speed end (refer FIG. 4), thus providing a favorable steering sensation.

Figure 5:
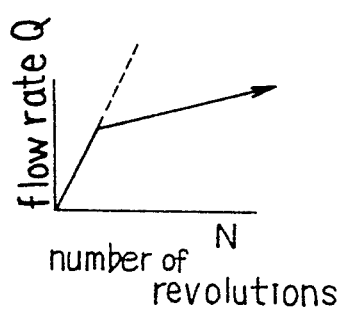
FIG. 5 is a schematic diagram of another response of the main pump.
Figure 6:
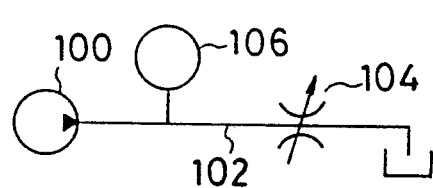
FIG. 6 is schematic diagram of a conventional hydraulic reaction mechanism.
Figure 7:
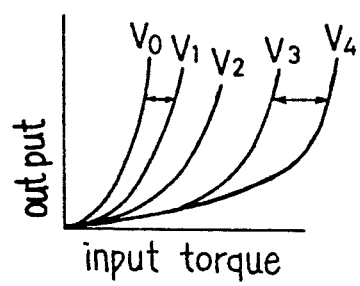
FIG. 7 graphically shows relationship between an output and an input torque of a conventional power steering apparatus.

If a main pump is selected for the pump 2 which exhibits a characteristic as illustrated in FIG. 5, the pitch with which the steering force changes can be enhanced toward the high speed end. In this manner, the pitch with which the steering force is controlled may be arbitrarily selected by choosing the characteristic of a main power steering pump together with the addition of the fixed restriction.

Figure 8:
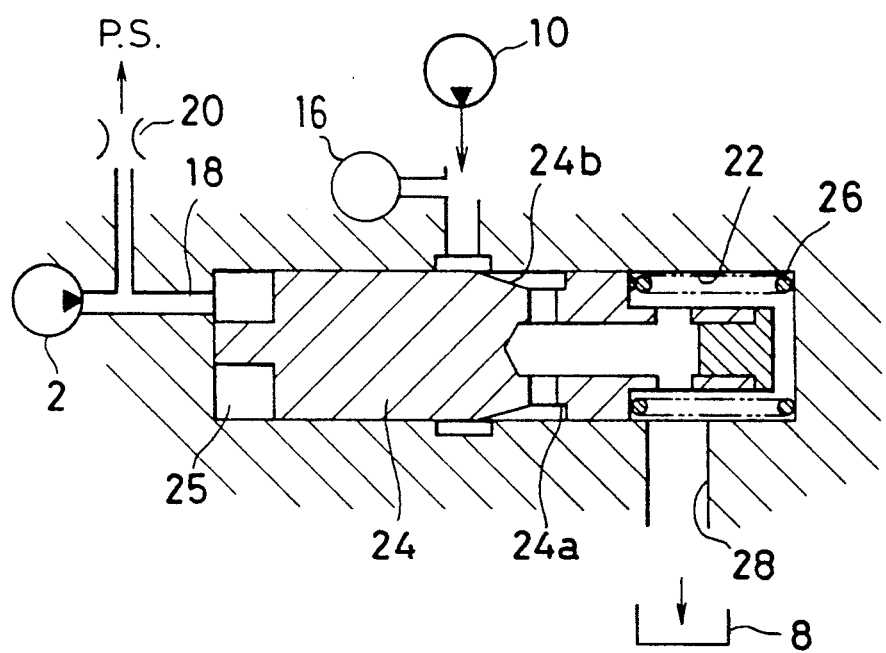
FIG. 8 is a cross section of another form of variable throttle.

FIG. 8 shows another form of variable throttle 14, and corresponding parts are designated by like numerals as used in FIG. 2, and therefore will not be described specifically. In this instance, the annular groove 24a which is formed in the outer peripheral surface of the spool 24 is chamferred as shown at 24b. The area of opening of the variable throttle 14 can be changed at will depending on the configuration of the chamfer 24b, allowing a more desirable steering sensation to be provided.

While the invention has been disclosed above in connection with the several embodiments thereof, it should be understood that the invention is not limited thereto, but that a number of changes, modifications and substitutions therein will readily occur to one skilled in the art from the above disclosure without departing from the scope and spirit of the invention difined by the appended claims.

What is claimed is:

1. A steering force control system for power steering, comprising:

means defining an oil reservoir with oil therein;

a main pump for drawing oil from said reservoir and discharging said oil under pressure at a flow rate which decreases in accordance with an increasing number of revolutions thereof;

a control valve having inlet and outlet ports thereon and a reservoir port connected to said reservoir, said outlet ports being connected in fluid circuit with a power cylinder;

means defining a first fluid circuit from said main pump to said inlet port of said control valve, said first fluid circuit including a series connected fixed throttle and an oil pressure monitoring means for monitoring the pressure of the oil in said first fluid circuit, said oil pressure monitoring means being oriented between said main pump and said fixed throttle;

means defining a second fluid circuit connecting said reservoir port on said control valve to a reservoir;

a vehicle speed responsive subpump for discharging oil under pressure at a flow rate which increases with an increase in vehicle speed; and means defining a third fluid circuit interconnecting said subpump to said second fluid circuit, said third fluid circuit including a series connected oil pressure responsive variable throttle means for restricting the flow rate therethrough in response to an increasing oil pressure signal elsewhere in the system and a hydraulic reaction chamber connected upstream of said variable throttle, said oil pressure monitoring means producing an oil pressure signal which is connected in circuit with and for controlling said variable throttle to thereby effect an altering of the steering force required to steer a vehicle.

2. The steering force control system according to claim 1, wherein said variable throttle means comprises a housing having an elongated opening therein and a spool slidably disposed in said opening, a spring for urging said spool toward one end of said opening, an annular groove being formed in the outer peripheral surface of said spool and connected in fluid circuit with said third fluid circuit to provide a communication between the subpump and said reservoir, an oil pressure which prevails upstream of said fixed throttle acting upon an end of said spool which is located opposite from said spring.

3. The steering force control system according to claim 2, wherein the annular groove has at least one chamferred side wall.

* * * * *